United States Patent [19]

Brooker et al.

[11] 3,715,351

[45] Feb. 6, 1973

[54] CYANINE DYES CONTAINING A CYCLOPENTANONE NUCLEUS

[75] Inventors: Leslie G. S. Brooker; Arthur Fumia, Jr., both of Rochester, N.Y.

[73] Assignee: Eastman Kodak Company, Rochester, N.Y.

[22] Filed: Feb. 24, 1970

[21] Appl. No.: 17,003

Related U.S. Application Data

[62] Division of Ser. No. 656,647, July 28, 1967, abandoned.

[52] U.S. Cl.............260/240.4, 96/130, 260/240 R
[51] Int. Cl..............................................C09b 23/02
[58] Field of Search........................260/240 R, 240.4

[56] References Cited

FOREIGN PATENTS OR APPLICATIONS 862,444   3/1961   Great Britain.......................260/240

OTHER PUBLICATIONS

Szmuszkovicz, "Advances in Organic Chemistry, Methods and Results," Volume 4, Raphael et al. (ed.), Interscience, New York (1963), pp. 10, 22–25, 38 and 47.

*Primary Examiner*—Henry R. Jiles
*Assistant Examiner*—G. Thomas Todd
*Attorney*—Robert W. Hampton and Michael R. Chipaloski

[57]   ABSTRACT

Novel cyanine dyes containing a cyclopentanone nucleus in the methine chain are prepared by the acid hydrolysis of cyanine enamine derivatives. These cyanine dyes are spectral sensitizers for photographic silver halide emulsions. A number of the new dyes extend the sensitivity of photographic silver halide emulsions into the red and near infra-red regions of the spectrum.

8 Claims, No Drawings

CYANINE DYES CONTAINING A CYCLOPENTANONE NUCLEUS

This application is a division of our copending application Serial No. 656,647 filed July 28, 1967, now abandoned.

This invention relates to novel photographic materials, and more particularly to a new class of cyanine dyes containing a cyclopentanone nucleus in the methine chain, to novel spectrally sensitized photographic silver halide emulsions and elements prepared therewith, and to the preparation of these dyes and photographic materials.

It is well known that cyanine dyes extend the sensitivity of photographic silver halide emulsions. However, this class includes whole groups of dye compounds which have no sensitizing ability or which even have a desensitizing effect. The number of sensitizers of this class which can be used in practice is further limited by the strict requirements that a really useful sensitizer must meet, when incorporated into silver halide emulsion layers. For example, the clearness of the layers and images produced therein must not be reduced by the presence of the sensitizer, and stability on storage, particularly as regards freedom from fogging and degree of sensitization must be maintained. Furthermore, the gradation in both the fresh and in the aged condition must remain unchanged at the required value. These requirements are especially applicable to sensitizers for color photographic processes, which sensitizers in addition, need to have a particularly high sensitizing action and also a special selectivity.

We have now found that certain cyanine dyes containing a cyclopentanone nucleus in the methine chain are especially well adapted to fill the above-mentioned requirements, and thus provide a new class of excellent spectral sensitizers for both black and white and color photographic materials and processes. A number of these new dyes extend the sensitivity of photographic silver halide emulsions into the red and near infra-red regions of the spectrum.

It is, accordingly, an object of the our invention to provide a new class of cyanine dyes that are useful spectral sensitizers for photographic silver halide emulsions.

Another object is to provide novel photographic silver halide emulsions containing one or more of the new dyes of the invention, and novel photographic elements prepared therewith.

A further object is to provide means for preparing the new dyes and photographic materials of the invention.

Other objects will become apparent from a consideration of the general description and examples, and the appended claims.

The new class of cyanine dyes of the invention are represented by the following general formulas:

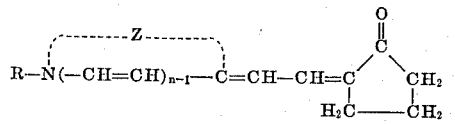

and

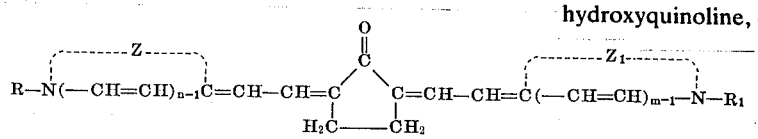

wherein $m$ and $m$ each represents a positive integer of from 1 to 2, R and $R_1$ each represents an alkyl group, preferably a lower alkyl containing from one to four carbon atoms, e.g., methyl, ethyl, propyl, isopropyl, butyl, hexyl, decyl, dodecyl, etc., a substituted alkyl group, preferably a lower group containing one to four carbon atoms, such as a hydroxyalkyl group, e.g., $\beta$-hydroxyethyl, $\gamma$-hydroxypropyl, $\omega$-hydroxybutyl, etc., an alkoxyalkyl group, e.g., $\beta$-methoxyethyl, $\omega$-butoxybutyl, etc., a carboxyalkyl group, e.g., $\beta$-carboxyethyl, $\omega$-carboxybutyl, etc., a sulfoalkyl group, e.g., $\beta$-sulfoethyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\omega$-propionyloxybutyl, etc., an alkoxycarbonylalkyl group, e.g., $\beta$-methoxycarbonylethyl, $\omega$-ethoxycarbonylbutyl, etc., an allyl group, an aralkyl group, e.g., benzyl, phenethyl, etc., or an aryl group, e.g., phenyl, tolyl, chlorophenyl, sulfophenyl, carboxyphenyl, etc., and and Z and $Z_1$ each represents the nonmetallic atoms required to complete a 5- to 6- membered heterocyclic nucleus including a thiazole nucleus (e.g., thiazole, methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 4-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a thianaphtheno-7′, 6′, 4,5-thiazole, etc.), an oxazole nucleus (e.g., 4-methyloxazole, 5-methyloxazole, 4-phenyloxazole, diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 6chlorobenzoxazole, 6-methoxybenzoxazole, 5-hydroxybenzoxazole, 6-hydroxybenzoxazole, etc.), a naphthoxazole nucleus (e.g., $\alpha$-naphthoxazole, $\beta\beta$-naphthoxazole, $\beta$-naphthoxazole, etc.), those of the selenazole series (e.g., 4-methylselenazole, 4-phenylselenazole, etc.), a benzoselenazole nucleus (e.g., benzoselenazole, 5chloroselenazole, 5-methoxybenzoselenazole, 5-hydroxybenzoselenazole, tetrahydrobenzoselenazole, etc.), a naphthoselenazole nucleus (e.g., $\alpha$-naphthoselenazole, $\beta,\beta$-naphthoselenazole, $\beta$-naphthoselenazole, etc.), a thiazoline nucleus (e.g., thiazoline, 4-methylthiazoline, etc.), a 2-quinoline nucleus (e.g., quinoline, 3-methylquinoline, 5-methylquinoline, 7-methylquinoline, 8-methylquinoline, 6-chloroquinoline, 6-methoxyquinoline, 6-ethoxyquinoline, 6-hydroxyquinoline, 8-hydroxyquinoline, etc.), a 4-quinoline nucleus (e.g., 6- methoxy-4-quinoline, 7-methyl-4-quinoline, etc.,), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 3,3,5-trimethylindolenine, 3,3.7-trimethylindolenine, etc.), a 2-pyridine nucleus (e.g., pyridine, 3-methylpyridine, 4-methylpyridine, 5-methylpyridine, 3,4-dimethylpyridine, 4-chloropyridine, 3-hydroxypyridine, 3phenylpyridine, etc.), a 4-pyridine nucleus (e.g., 2-methylpyridine, 3-methylpyridine, 3-chloropyridine, 2,6-dimethylpyridine, 3-hydroxypyridine, etc., a 1-alkylimidazole nucleus (e.g., 1-methylimidazole, 1-ethyl-4-phenylimidazole, 1butyl-4,5-dimethylimidazole, etc.), a 1-alkylbenzimidazole nucleus (e.g., 1-methylbenzimidazole, 1-butyl-4-methylbenzimidazole, 1-ethyl-5,6-dichlorobenzimidazole, etc.), a 1-alkylnaphthimidazole nucleus (e.g., 1-ethyl-α-naphthimidazole, 1-methyl-β-naphthimidazole, etc.), and the like. The symmetrical dyes of the invention coming under Formula II above which contain benzothiazole nuclei are particularly useful spectral sensitizers for photographic silver halide emulsions and are preferred.

The new cyanine dyes of the invention as defined by Formula I above can be readily prepared by hydrolysis of a compound of the general formula:

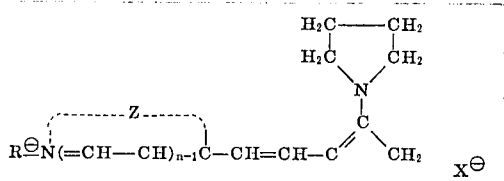

wherein $n$, R and Z are as previously defined, and X represents an acid anion such as chloride, bromide, iodide, thiocyanate, sulfamate, perchlorate, p-toluenesulfonate, methyl sulfate, ethyl sulfate, etc., in an aqueous solution of a strong mineral acid such as hydrochloric acid, sulfuric acid, etc., at elevated temperatures and preferably at refluxing temperatures of the reaction mixture, until the hydrolysis reaction is completed. The dye products are then separated from the reaction mixtures by chilling and purified by one or more recrystallizations from suitable solvents such as pyridine/methanol, etc.

The new cyanine dyes of the invention as defined by Formula II above are prepared by a similar hydrolysis method as described above, except that here the compound that is hydrolyzed is represented by the following general formula:

IV.

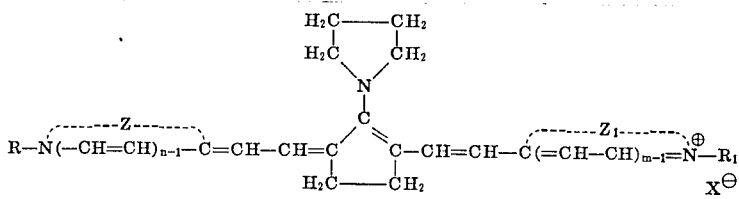

wherein $m,n$, R, $R_1$, X, Z and $Z_1$ are as previously defined.

The intermediate dye compounds defined by Formula III above can be conveniently prepared by condensing approximately 1 mole of N-cyclopentenylpyrrolidine with 1 mole of a compound of the general formula:

V.

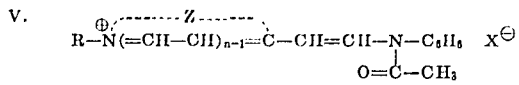

wherein $n$, R, X and Z are as previously defined.

The symmetrical intermediate dye compounds defined by Formula IV above can be conveniently prepared for example, by condensing approximately 1 mole N-cyclopentenylpyrrolidine with 2 moles of a compound selected from above Formula V. To prepare the unsymmetrical intermediate dye compounds of Formula IV above, an appropriate compound of Formula III above is condensed with an appropriate compound of Formula V above, in approximately equimolar proportions.

For further details concerning the preparation of cyanine dye intermediates defined by Formulas III and IV above, reference can be had to copending application of R. A. Jeffreys, Ser. No. 518,010filed Jan. 3, 1966, now U. S. Pat. No. 3,506,655,655 issued April 14, 1970 wherein the preparation of such intermediate dyes are described and claimed.

The following examples further illustrate this invention.

Example 1

2,5-Bis[(3-ethyl-2-benzothiazolinylidene)ethylidene]cyclopentanone

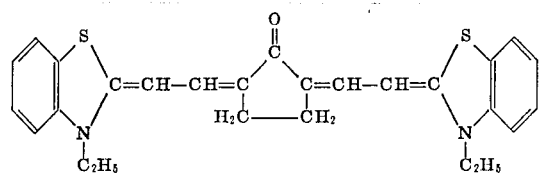

3,3'-Diethyl-10,12-ethylene-11-(1-pyrrolidinyl)thiatricarbocyanine iodide (6.4 g., 1 mol.), water (25 ml.), and 36 percent hydrochloric acid (2 ml.) were mixed and heated under reflux with stirring. The mixture was diluted several times with additional acid and water, with refluxing, continued until the absorption of the starting material had disappeared. After chilling, the solid was collected on a funnel, washed with acetone and dried. After two recrystallizations from pyridine/methanol, the yield of purified dye was 2.1 g. (46 percent) m.p. 246°–247°C. decomposes.

In place of the 3,3'-diethyl-10,12-ethylene-11-(1-pyrrolidinyl) thiacarbocyanine iodide in the above example, there can be substituted an equivalent amount of, for example, 3,3'-diethyl-10,12-ethylene-11-(1-pyrrolidinyl)oxatricarbocyanine salt such as the chloride, bromide, iodide, etc., or a 3,3'-diethyl-10,12-ethylene-11-(1-pyrrolidinyl)selenotricarbocyanine salt or a 3,3'-diethyl-10,12-ethylene-11-(1-pyrrolidinyl)thiazolotricarbocyanine salt, and the like, to give the corresponding cyanine dyes of the invention having generally similar spectral sensitizing properties when incorporated in photographic silver halide emulsions.

Example 2

2,5-Bis[(1-ethylnaphtho[1,2-d]thiazolin-2-ylidene)ethylidene]cyclopentanone

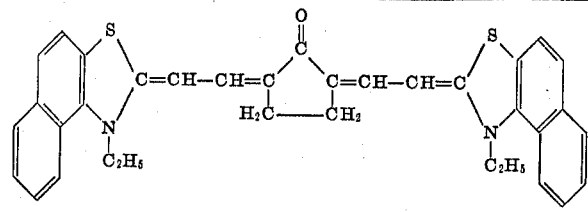

3,3'-Diethyl-10,12-ethylene-11-(1-pyrrolidinyl)-4,5,4',5'-dibenzothiatricarbocyanine p-toluenesulfonate (3.9 g., 1 mol.), water (75 ml.), ethanol (200 ml.), and 36 percent hydrochloric acid (5 ml.) were heated under reflux with stirring. The mixture was diluted several times with additional acid and water with refluxing continued until the absorption of the starting material had disappeared. After chilling, the solid was collected on a funnel, washed with methanol and dried. After two recrystallizations from pyridine/methanol, the yield of purified dye was 0.9 g. (32 percent), m.p. 275°–276°C. dec.

In place of the 3,3'-diethyl-10,12-ethylene-(1-pyrrolidinyl)-4,5,4',5'-dibenzothiacarbocyanine p-toluenesulfonate in the above example there can be substituted an equivalent amount of, for example, 3,3'-diethyl-10,12-ethylene-(1-pyrrolidinyl)-4,5,4',5'-dibenzoxatricarbocyanine salt such as the chloride, bromide, iodide, etc., to give the corresponding cyanine dye of the invention having generally similar spectral sensitizing properties for photographic silver halide emulsions.

EXAMPLE 3

2,5-Bis[1,3,3-trimethyl-2-indolinylidene)ethylidene]-cyclopentanone

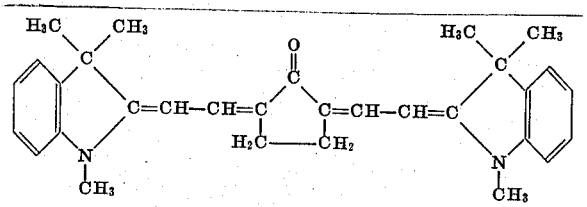

10,12-Ethylene-1,1',3,3,3',3'-hexamethyl-11-(1-pyrrolidinyl)indotricarbocyanine iodide (6.3 g., 1 mol.) was treated with water and 36 percent hydrochloric acid in the same manner as example 2. After two recrystallizations from pyridine/methanol, the yield of purified dye was 1.1 g. (25 percent), m.p. 265°–266°C. dec.

EXAMPLE 4

2[(3-Ethyl-2-benzothiazolinylidene)ethylidene]-cyclopentanone

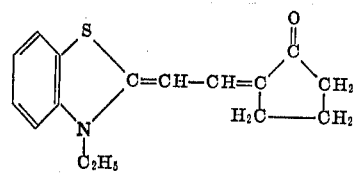

3-Ethyl-2-{2-[2-(1-pyrrolidinyl)cyclopentenyl]vinyl}benzothiazolium iodide (6.0 g., 1mol.) was treated with water and 36 percent hydrochloric acid in the manner as example 2. After two recrystallizations from pyridine/methanol, the yield of purified dye was 1.1 g. (31 percent), m.p. 230°–231°C. dec.

In place of the 3-ethyl-2-{2-[2-(1-pyrrolidinyl)cyclopentyl] benzothiazolium iodide in the above example, there can be substituted an equivalent amount of, for example, 3-ethyl-2-{2-[2-(1-pyrrolidinyl)cyclopentyl]vinyl}benzoxazolium salt such as the bromide, chloride, iodide, etc., or the corresponding selenazolium salts, or the corresponding thiazolium salts, and the like, to give the corresponding cyanine dyes of the invention that likewise extend the sensitivity of photographic silver halide emulsions.

The above prepared dyes of the invention were then tested in a silver chlorobromide emulsion. The dyes, dissolved in suitable solvents, were added to separate portions of the emulsion, at the concentrations indicated in the following Table 1. After digestion at 50°–52C. for about 10 minutes, the emulsions were coated at a coverage of 459 mg. of silver and 1,040 mg. of gelatin per square foot on a cellulose acetate film support. A sample of each coating was exposed on an Eastman 1B sensitometer and to a wedge spectrograph, processed for 5 minutes in Kodak DK–50 developer ("Handbook of Chemistry and Physics," 30th edition, 1947, Chemical Rubber Publishing Co., Cleveland, Ohio, page 2,558) having the following composition:

| | |
|---|---|
| N-methyl-p-aminophenol sulfate | 2.5 g. |
| Sodium Sulfite (desiccated) | 30.0 g. |
| Hydroquinone | 2.5 g. |
| Sodium metaborate | 10.0 g. |
| Potassium bromide | 0.5 g. |
| Water to make | 1.0 liter | and then fixed in a conventional sodium thiosulfate fixing bath, washed and dried. The sensitizing values obtained are shown in the following Table 1.

TABLE 1

| Dye of Example No. | Dye & Concentration g/mole Silver | Emulsion Type | Sensitization Range(mμ) | Maxium(mμ) |
|---|---|---|---|---|
| 1 | 0.13 | Silver Chlorobromide | 500 to 740 | 665 |
| 2 | 0.13 | " | 500 to 750 | No definite maximum |
| 3 | 0.13 | " | 540 to 670 | 600 |
| 4 | 0.13 | " | to 550 | 515 |

The following examples illustrate the preparation of the intermediate dye compounds employed in the procedures of above examples 1 to 4 to prepare the cyanine dyes of the invention. As indicated previously, additional details for the preparation of these and related dye intermediates can be had by reference to the

EXAMPLE 5

3,3'-Diethyl-10,12-ethylene-11-(1-pyrrolidinyl)-thiatricarbocyanine iodide

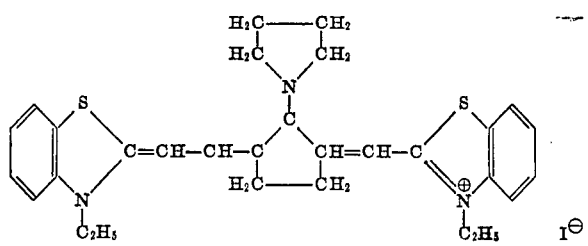

N-Cyclopentenylpyrrolidine (0.7 gram), 2-[2-acetanilidovinyl]-3-ethylbenzothiazolium iodide (4.5 grams) and sodium acetate (0.8 gram) in acetic anhydride (25 ml.) were refluxed together for one-fourth hour, and the resulting blue solution was chilled to precipitate the dye product formed. The dye product was filtered off, washed with ethanol and water, and recrystallized from methanol as moss green needles, m.p. above 345°C., in 1 gram (31 percent) yield.

EXAMPLE 6

3,3'-Diethyl-10,12-ethylene-11-(1-pyrrolidinyl)-4,5,4',5'fonate

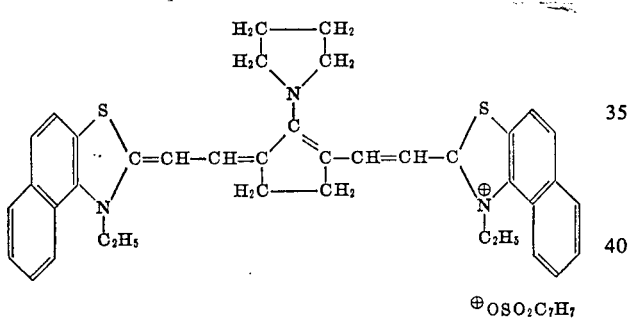

2-(2-Anilinovinly)-1-ethyl-naphtho[1,2-d]thiazolium p-toluenesulfonate (21 g., 2 mols. + 5 percent), N-cyclopentenylpyrrolidine (2.7 g., 1 mol.), triethylenediamine (7.4 g., 2 mols. + 10 percent), and acetic anhydride (3.7 ml., 2 mols.) were dissolved in N,N-dimethylacetamide (40 ml.) and heated on a steam bath, with stirring, for one-half hour. After chilling, the crude product was collected on a filter, washed with methanol and dried. After two recrystallizations from methanol, the yield of purified dye was 6.1 g. (39 percent), m.p. 253°–254°C. dec.

EXAMPLE 7

10,12-Ethylene-1,1',3,3,3',3'-hexamethyl-11-(1-pyrrolidinyl)indotricarbocyanine iodide

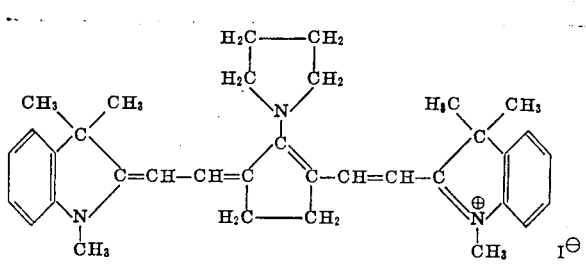

2-(2-Acetanilidovinyl)-1,3,3-trimethylindolium iodide (9.4 g., 2 mols. + 5 percent), N-cyclopentenyl-pyrrolidine (1.4 g., 1 mol.), and triethylenediamine (2.2 g., 1 mol. + 100 percent) were dissolved in N,N-dimethylacetamide (25 ml.) and heated on a steam bath, with stirring, for 15 minutes. After chilling, the reaction mixture was filtered and the filtrate treated with ether to precipitate the product. The crude product was collected on a filter and after two recrystallizations from methanol, the yield of purified dye was 2.1 g. (33 percent), m.p. 242°–243°C. dec.

EXAMPLE 8

3-Ethyl-2 2-[2-(1-pyrrolidinyl)cyclopentenyl]-vinyl benzothiazolium iodide

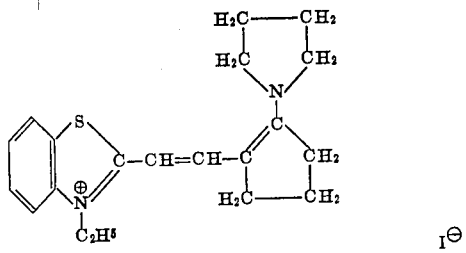

N-Cyclopentenylpyrrolidine (2.7 grams) and 2-[2-acetanilidovinyl]-3-ethylbenzothiazolium iodide (9 grams) in ethanol (25 ml.) were shaken together at room temperature for one-half hour. The dye product formed was filtered off and recrystallized from ethanol to remove magenta and blue impurities. The orange dye was obtained as maroon leaflets, m.p. 297°–299°C. with decomp. (darkens at 290°C.) in 2.1 grams (23 percent) yield.

EXAMPLE 9

N-Cyclopentenylpyrrolidine

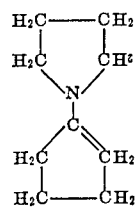

This compound was prepared in the manner described by G. Stark, et al., J. Am. Chem. Soc. 85, 216 (1963).

For the preparation of photographic emulsions, the new dyes of the invention are advantageously incorporated in the finished silver halide emulsion and should, of course, be uniformly distributed throughout the emulsion. The method of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of the new dyes of the invention. The type of silver halide emulsions that are sensitized with the new dyes include any of those prepared with hydrophilic colloids that are known to be satisfactory for dispersing light-sensitive silver halides, for example, emulsions prepared with hydrophilic colloids, such as natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of the new dyes in the emulsions can be widely varied, i.e., generally from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The emulsions are coated to advantage on any of the support materials commonly used for photographic elements, for example, paper, glass cellulose derivatives, such as cellulose acetate, cellulose acetate-propionate, cellulose nitrate, etc., synthetic resins, such as polystyrene, polyethylene terephthalate and other polyesters, polyamides, such as nylon, and the like.

To prepare a gelatino-silver halide emulsion desensitized with one of the new dyes, the following procedure is satisfactory: A quantity of dye is dissolved in a suitable solvent, and a volume of this solution containing the desired amount of dye is slowly added with intimate mixing to about 1,000 cc. of light-sensitive gelatino-silver halide emulsion. With most of the new dyes, from about 10 to 20 mg. of dye per liter of emulsion suffices to produce the desired sensitizing effect with the ordinary gelatine-silver halides including silver chloride, bromide, bromoiodide, chlorobromide, chlorobromoiodide, etc., emulsions. With fine-grain emulsions which include most of the ordinary employed gelatino-silver chloride emulsions, somewhat larger concentrations of dye may be necessary to secure optimum sensitizing effect. While the preceding has dealt with emulsions comprising gelatin, it will be understood that these remarks apply generally to any emulsions in which a part of all of the gelatin is substituted by another suitable hydrophilic colloid such as those previously mentioned.

The above statements are only illustrative and are not to be understood as limiting the invention in any sense, as it will be apparent that the new dyes can be incorporated by other methods in many of the emulsions customarily used in the art. For instance, in a less preferred method, the dyes can be incorporated by bathing a plate or film bearing an emulsion, in a solution of the dye.

Photographic silver halide emulsions, such as those listed above, containing the sensitizing dyes of the invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see Baldsiefen U. S. Pat. No. 2,540,085, issued Feb. 6, 1951; Damschroder U. S. Pat. No. 2,597,856, issued May 27, 1952 and Yutzy et al. U. S. Pat. No. 2,597,915, issued May 27, 1952), various palladium compounds such as palladium chloride (Baldsiefen U. S. Pat. No. 2,540,086, issued Feb. 6, 1951), potassium chloropalladate (Stauffer et al. U. S. Pat. No. 2,598,079, issued May 27, 1952), etc., or mixtures of such sensitizers; antifoggants, such as ammonium chloroplatinate (Trivelli et al. U. S. Pat. No. 2,566,245, issued Aug. 28, 1951), ammonium chloroplatinite (Trivelli et al. U. S. Pat. No. 2,566,263, issued Aug. 28, 1951), benzotriazole, nitrobenzimidazole, 5-nitroindazole, benzidine, mercaptans, etc. (see Mees—"The Theory of the Photographic Process," MacMillan Pub., 1942, page 460), or mixtures thereof; hardeners, such as formaldehyde (Miller U. S. Pat. No. 1,763,533, issued June 10, 1930), chrome alum (U. S. Pat. No. 1,763,533), glyoxal (Brunken U. S. Pat. No. 1,870,354, issued Aug. 9, 1932), dibromacrolein (Block et al. British Pat. No. 406,750, accepted Mar. 8, 1934), etc.; color couplers, such as those described in Salminen et al. U. S. Pat. No. 2,423,730, issued July 7, 1947, Spence and Carroll U. S. Pat. No. 2,640,776, issued June 2, 1953, etc.; or mixtures of such addenda. Dispersing agents for color couplers, such as those set forth in Jelley et al. U. S. Pat. No. 2,322,027, issued June 15, 1943, and Mannes et al. U. S. Pat. No. 2,304,940, issued Dec. 15, 1942, can also be employed in the above-described emulsions.

The invention has been described in detail with particular reference to preferred embodiments thereof but it will be understood that variations and modifications can be effected within the spirit and scope of the invention as described hereinabove and as defined in the appended claims.

We claim:

1. A cyanine dye compound selected from those having one of the following formulas:

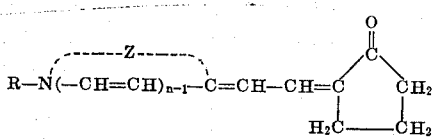

and

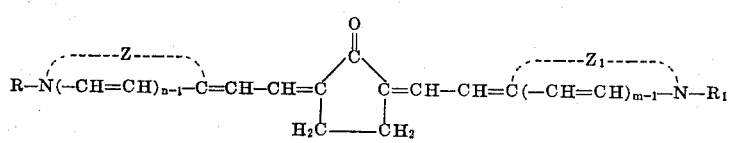

wherein $m$ and $n$ each represents a positive integer of from 1 to 2; R and $R_1$ each represents a member selected from the group consisting of an alkyl group containing from one to 12 carbon atoms, an allyl group, a phenyl and a naphthyl group; and, Z and $Z_1$ each represents the non-metallic atoms necessary to complete a heterocyclic nucleus selected from the group consisting of a thiazole nucleus, a benzothiazole nucleus, a naphthothiazole nucleus, a thianaphtheno- 7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a pyridine nucleus, an imidazole nucleus, a benzimidazole nucleus and a naphthimidazole nucleus.

2. A cyanine dye having the following formula:

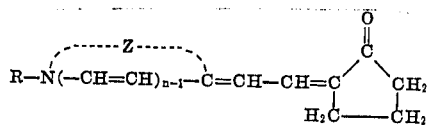

wherein $n$ represents a positive integer of from 1 to 2; R represents a member selected from the group consisting of an alkyl group containing from one to four atoms, an allyl group, a phenyl group and a naphthyl group; and, Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a pyridine nucleus, an imidazole nucleus, a benzimidazole nucleus and a naphthimidazole nucleus.

3. A cyanine dye having the following formula:

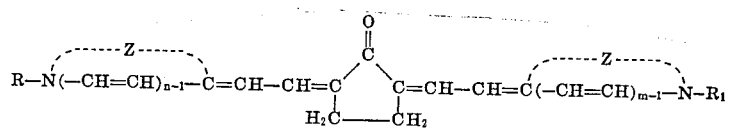

wherein m and n represents a positive integer of from 1 to 2; R and $R_1$ each represents a member selected from the group consisting of an alkyl group containing from one to four carbon atoms, an allyl group, a phenyl group and a naphthyl group; and, each Z represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3,3-dialkylindolenine nucleus, a pyridine nucleus, an imidazole nucleus, a benzimidazole nucleus and a naphthimidazole nucleus.

4. A cyanine dye having the following formula:

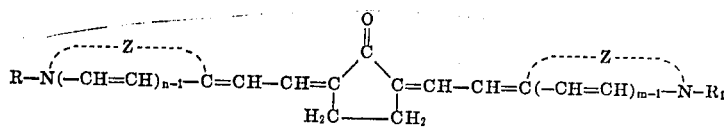

wherein $m$ and $n$ represents a positive integer of from 1 to 2; R and $R_1$ each represents a member selected from the group consisting of an alkyl group containing from one to four carbon atoms, an allyl group, a phenyl group and a naphthyl group; and, Z and $Z_1$ each represents the non-metallic atoms necessary to complete a heterocyclic nucleus selected from the group consisting of a thiazole nucleus, a benzothiazole nucleus, a naphthothiazole nucleus, a thianaphtheno-7',6',4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a 3,3-dialkylindolenine nucleus, a pyridine nucleus, an imidazole nucleus, a benzimidazole nucleus and a naphthimidazole nucleus.

5. 2,5-bis[(3-ethyl-2-benzothiazolinylidene)-ethylidene]cyclopentanone.

6. 2,5-bis[(1-ethylnaphtho[1,2-d]thiazolin-2-ylidene)ethylidene]cyclopentanone.

7. 2,5-bis[(1,3,3-trimethyl-2-indolinylidene)-ethylidene]cyclopentanone.

8. 2-[(3-ethyl-2-benzothiazolinylidene)ethylidene]-cyclopentanone.

* * * * *